United States Patent [19]

Müller

[11] Patent Number: 4,794,513

[45] Date of Patent: Dec. 27, 1988

[54] POSITION CONTROL SYSTEM FOR COMPUTER-CONTROLLED PROCESSING MACHINES

[75] Inventor: Peter Müller, Hausen, Fed. Rep. of Germany

[73] Assignee: Siemens Aktiengesellschaft, München, Fed. Rep. of Germany

[21] Appl. No.: 836,839

[22] Filed: Mar. 6, 1986

[30] Foreign Application Priority Data

Mar. 29, 1985 [DE] Fed. Rep. of Germany ....... 3511616

[51] Int. Cl.$^4$ .............................................. G06F 15/46
[52] U.S. Cl. ................... 364/167.01; 318/562; 364/183; 364/513; 901/2; 901/9; 901/15
[58] Field of Search ................ 364/474, 513, 167–171, 364/191–193, 174, 183; 318/562, 568; 901/2, 9, 11–13, 15, 19, 23, 24, 27, 28, 29, 35, 46, 50; 414/730

[56] References Cited

U.S. PATENT DOCUMENTS

| | | | |
|---|---|---|---|
| 4,467,436 | 8/1984 | Chance et al. | 364/513 |
| 4,481,569 | 11/1984 | Hoodbhoy | 364/513 X |
| 4,484,294 | 11/1984 | Noss | 364/513 |
| 4,604,561 | 8/1986 | Kamajima et al. | 364/131 X |
| 4,611,296 | 9/1986 | Niedermayr | 364/513 |
| 4,616,326 | 10/1986 | Meier et al. | 364/513 |
| 4,631,689 | 12/1986 | Arimura et al. | 364/513 |

FOREIGN PATENT DOCUMENTS

0120677 10/1984 European Pat. Off. .

OTHER PUBLICATIONS

A. M. Karklins, et al., "A Microprocessor's Role in the Space Shuttle Remote Manipulator Arm", 8080 Wescon Tech. Paper, vol. 26, Sept. '82, pp. 4/2-1 to 4/2-6.

Primary Examiner—Joseph Ruggiero
Attorney, Agent, or Firm—Kenyon & Kenyon

[57] ABSTRACT

A position control system for the movable machine parts of industrial robots, machine tools and the like comprising an actual position transmitter and counter arrangement coupled to each movable machine part. The readings of the counters are transmitted to a computer control, via a serial data bus such as a lightguide bus, which then compares the readings to reference values. Positioning commands for the drives of the movable machine parts are derived from the computer control comparisons and issued to the respective drives.

4 Claims, 1 Drawing Sheet

POSITION CONTROL SYSTEM FOR COMPUTER-CONTROLLED PROCESSING MACHINES

TECHNICAL FIELD

The invention relates to a position control system for the movable parts of computer-controlled processing machines such as machine tools or industrial robots.

BACKGROUND OF THE INVENTION

In order to determine the actual positions of the movable parts of a computer-controlled processing machine, it is known, for instance, in the case of machine tools or industrial robots, to couple an actual position transmitter, such as an incremental transmitter, directly or indirectly to each movable machine part. The pulses delivered by each transmitter are then added up as an actual position or distance value in a suitable computer control. The added-up actual distance values accumulated during the respective sampling periods of the position control system are then compared at the appropriate sampling instant in a known manner with reference values in the computer control. From the comparison results, the computer control then forms positioning commands for the drives of the movable machine parts. The instant processing in the computer control can be performed at a fixed clock cycle, for instance, every two milliseconds.

Problems arise, however, in high-resolution measuring transmitters, such as, incremental measuring transmitters with pulse multiplication, in which the transmission frequency rises up into the megahertz range. The transmission of serial pulses with the position information to the computer control for summation and comparison via data lines then becomes extremely critical as to disturbances and switching elements. The use of high frequency interference suppression and decoupling are relatively costly solutions to the problem.

It is thus an object of the present invention to make provision in a position control system, in which electrical pulses with a high frequency are supplied by actual position transmitters, that conventional transmission lines can be used without special arrangements.

SUMMARY OF THE INVENTION

The foregoing problem is obviated by the present invention which comprises:
 (a) means for measuring the actual position movement of each movable machine part;
 (b) means for collecting and processing the actual position movement values of each movable machine part for transmission;
 (c) means for transmitting the collected and processed actual position movement values; and
 (d) means for receiving the collected and processed actual position movement values and deriving positioning commands for controlling the drives of each movable machine part therefrom.

With the present invention, the summation of the individual pulses containing the position measurements takes place in or at the measuring means via the means for collecting and processing. The collected and processed information is then made available and transmitted for further processing to the receiving and deriving means in a clock raster. The transmission problem is substantially simplified thereby. If it is assumed, for instance, that the clock raster is two milliseconds, it is understandable that the transmission of processed data, for instance, a word which is 12 bits wide in serial form, can take place in a very short time span without large expenditures of technical means in contrast to the transmission of unprocessed data.

Advantageously, the measuring means can comprise an actual position transmitter and the means for collecting and processing can comprise an electrical counter. Further, the receiving and deriving means can be a computer control and the transmission means can be a data line, such as, a serial bus. The serial bus can be designed so that several actual position transmitters can be connected which are interrogated sequentially by the computer control. If a lightguide is used as the serial bus, only one cable is sufficient for the data transmission. This is particularly important in the case of industrial robots because thereby the number of lines to be conducted inside the joints is reduced quite considerably.

BRIEF DESCRIPTION OF THE DRAWINGS

For a better understanding of the invention, reference is made to the following description of an exemplary embodiment thereof, and to the accompanying drawing, wherein.

DETAILED DESCRIPTION

Figure 1:
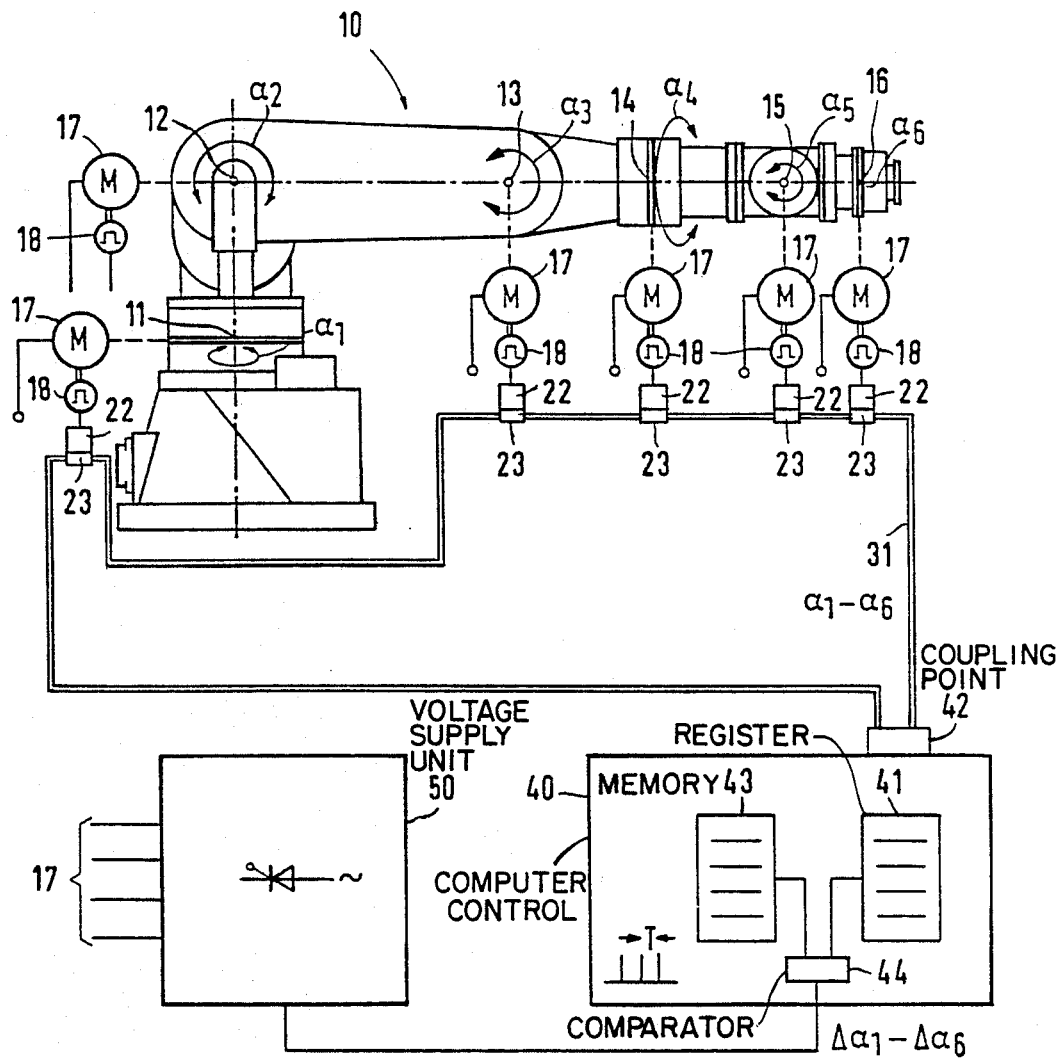
FIG. 1 is a schematic representation of a position control system of the present invention.

A jointed industrial robot 10, shown in FIG. 1, has six joints 11–16 by which rotation in six axes with respective angles $\alpha 1$–$\alpha 6$ is possible. Each individual joint 11–16 is driven by an associated permanent magnet-excited three-phase motor 17 which is integrated into the particular joint together with the corresponding step-down transmission (not shown) and a respective distance or position transducer 18 flanged thereto in the form of an incremental pulse transmitter. The motor arrangement is shown specifically only for the sake of clarity.

At the electrical output of each pulse transmitter 18, an electrical counter 22 (for instance, with 26 bits) is disposed which contains the present actual distance or position value of the particular joint movement obtained by summation. The individual counter readings of each counter 22 can be called up sequentially in a predetermined clock raster T of, for instance, two milliseconds, by means of a respective coupling point 23 on a serial bus 31 which can be in the form of a lightguide.

The individual counter readings arrive sequentially, via the bus 31, at a register 41 of a computer control 40 through a coupling point 42 and are made available to the control 40 as actual distance values for the respective axes. In a sampling cycle of, for instance, two milliseconds, the actual values so obtained are compared with reference values stored in a memory 43 by means of a comparator 44. The corresponding differences $\Delta\alpha 1$–$\Delta\alpha 6$ are used by the control 40 to formulate and issue appropriate commands for controlling the voltage supply units 50 for the motors 17. A computer control of this type is known, for instance, from the journal Seimens-Energietechik 1981, pages 285–289.

The position measurements obtained by each pulse transmitter 18 can be also be used for determining, in known manners, the direction of rotation of the particular axis and/or for measuring the speed. In addition, the realization of an absolute measuring system is greatly facilitated by the preprocessing of the measurements in the pulse transmitter 18 and by buffering. Further, the logic for the transmitter monitoring and the logic for running the reference points can be integrated concurrently and simultaneously in a pulse transmitter 18 so modified. Thus, commands for switching the commutation, for instance, of synchronous motors which serve for moving the movable machine parts can be derived at the actual measuring point.

It is to be understood that the embodiment described herein is merely illustrative of the principles of the invention. Various modifications may be made thereto by persons skilled in the art without departing from the spirit and scope of the invention.

What is claimed is:

1. A position control system for movable machine parts of a computer-controlled processing machine, comprising:
   (a) a plurality of actual position transmitters, each having an input which is coupled to a respective movable machine part and measures the position movement thereof and an output which delivers pulses corresponding to the position measurements of the respective movable machine part;
   (b) means for counting and summing the output pulses delivered from the actual position transmitters, said means for counting and summing being located substantially in the vicinity of each of the plurality of actual position transmitters;
   (c) a computer control which compares the position values present at the means for counting and summing with corresponding reference values stored therein and derives positioning commands for controlling the drives of the movable machine parts from the comparisons; and
   (d) a serial data bus for transmitting, in a predetermined time raster, the position values present at the means for counting and summing to the computer control for further processing.

2. The system set forth in claim 1, wherein the serial data bus comprises lightguide cable.

3. The system set forth in claim 1, wherein the computer control determines the speeds of the movable machine parts and derives speed commands for controlling the drives from the position values transmitted from the means for counting and summing.

4. The system set forth in claim 2, wherein the computer control determines the speeds of the movable machine parts and derives speed commands for controlling the drives from the position values transmitted from the means for counting and summing.

* * * * *